United States Patent [19]

Nishimura et al.

[11] Patent Number: 4,856,264

[45] Date of Patent: Aug. 15, 1989

[54] HYDRAULIC TRANSMISSION APPARATUS

[75] Inventors: Sadanori Nishimura; Hiroshige Makita; Tomoaki Ishikawa, all of Saitama, Japan

[73] Assignee: Honda Giken Kogyo Kabushiki Kaisha, Tokyo, Japan

[21] Appl. No.: 146,964

[22] Filed: Jan. 22, 1988

[30] Foreign Application Priority Data

Jan. 26, 1987 [JP] Japan .................................. 62-15450
May 29, 1987 [JP] Japan ................................ 62-134192
May 29, 1987 [JP] Japan ............................. 62-82652[U]

[51] Int. Cl.$^4$ ....................... A01D 34/76; A01D 34/80
[52] U.S. Cl. ....................................... 56/10.9; 56/11.3; 56/10.8; 56/11.8; 60/487; 60/490; 74/655
[58] Field of Search ....................... 56/10.8, 10.9, 11.1, 56/11.2, 11.8, 11.3, 11.9, 17.5, 255; 74/731, 655; 60/487, 490, 485

[56] References Cited

U.S. PATENT DOCUMENTS

| | | | |
|---|---|---|---|
| 3,209,538 | 10/1965 | Kuze | 60/485 |
| 3,318,092 | 5/1967 | Boydell | 60/487 |
| 3,751,924 | 8/1973 | Brown et al. | 60/487 |
| 4,538,401 | 9/1985 | Takamizawa et al. | 56/11.8 |
| 4,627,237 | 12/1986 | Hutson | 60/490 |
| 4,691,802 | 9/1987 | Ishimori et al. | 60/490 |

FOREIGN PATENT DOCUMENTS

1780529 1/1972 Fed. Rep. of Germany .
2722266 12/1977 Fed. Rep. of Germany .

Primary Examiner—John Weiss
Attorney, Agent, or Firm—Lahive & Cockfield

[57] ABSTRACT

A hydraulic transmission apparatus comprises an input unit to which power from a power source is applied in a first direction, a direction changing unit hydraulically coupled to the input unit for extracting power in a second direction which is different from the first direction, and a case supporting the input unit and the direction changing unit. The input unit and the direction changing unit comprise an oil pump and an oil motor mounted respectively on one surface and another surface of the case. The case is filled with working oil for operating the oil pump and the oil motor. An operating device for a lawn mower has a first power transmitting path for transmitting power from the power source to a drive wheel, the first power transmitting path having a hydraulic transmission apparatus and a first clutch for selectively rotating and stopping the drive wheel, and a second power transmitting path for transmitting power from the power source to a grass cutter, the second power transmitting path including a second clutch for selectively rotating and stopping the grass cutter. The first clutch is independently operable. The second clutch has a mechanism for inactivating the first clutch in unison therewith when the second clutch is inactivated.

7 Claims, 7 Drawing Sheets

HYDRAULIC TRANSMISSION APPARATUS

BACKGROUND OF THE INVENTION

1. Field of the Invention

The present invention relates to a hydraulic transmission apparatus, and more particularly to a hydraulic transmission apparatus for transmitting power from a power source such as an engine or an electric motor to drive wheels in a self-propelled working vehicle such as a lawn mower of the riding type or walk-behind type, a rotary tiller, a tractor, or the like.

2. Description of the Relevant Art

There have been proposed in recent years self-propelled working vehicles such as a lawn mower of the riding type or walk-behind type, a rotary tiller, a tractor, and the like. In the proposed self-propelled working vehicles, power from an engine or an electric motor is transmitted to drive wheels through a hydraulic transmission apparatus comprising an oil pump, an oil motor, a speed reducer, and other components.

Such a hydraulic transmission apparatus is disclosed in Japanese Pat. Publication No. 50-33283 published Oct. 29, 1975, entitled "Hydraulically driven transmission apparatus for tractors", and Japanese Laid-Open Utility Model Publication No. 60-89454 published June 19, 1985, entitled "Fluid transmission apparatus".

The transmission apparatus disclosed in the former publication has input means to which power is applied from a power source in a prescribed direction and direction changing means for extracting power in a direction different from the prescribed direction. Specifically, a power input shaft extends perpendicularly to a rear wheel axle, and the direction changing means comprises a plurality of bevel gears. Therefore, the transmission apparatus is made up of a large number of parts. As a result, the transmission apparatus is large in size and complex in structure, the process of assembling the transmission apparatus is complicated, and hence the cost of manufacture is high. These problems are amplified by the fact that a speed reducer mechanism is housed in a reducer case, and an oil pump and an oil motor are accommodated in a case separate from the reducer case.

According to the transmission apparatus disclosed in the latter publication, an oil pump and an oil motor are connected to each other by a closed hydraulic circuit. Where the transmission apparatus of this type is incorporated in a working vehicle, a clutch must be disposed between the oil pump and a power source in order to stop rotation of drive wheels for better maneuverability of the vehicle. This results in the same disadvantages as those of the transmission apparatus of the former publication.

U.S. Pat. No. 4,212,141 patented July 15, 1980 which was filed by the applicant discloses a self-propelled lawn mower having an operating device comprising a clutch for selectively rotating and stopping grass cutting blades and a clutch for selectively rotating and stopping drive wheels. First and second levers for operating the clutches are mounted on a handle. The clutches are connected when the levers are moved toward the handle. The first lever is independently movable, whereas when the second lever is moved, it engages the first lever to forcibly move the first lever.

The present invention is directed toward an improvement over the hydraulic transmission apparatus of a self-propelled working vehicle such as a lawn mower, and the operating device of the working vehicle. According to the present invention, the lawn mower can be moved while a cutter is being held at rest, allowing the working vehicle to be maneuvered with ease, and the speed of travel of the lawn mower can easily be adjusted with respect to the speed of rotation of the cutter.

SUMMARY OF THE INVENTION

It is an object of the present invention to provide a hydraulic transmission apparatus for self-propelled working vehicles, which is reduced in size and simplified in structure by being made up of a reduced number of parts, and which can be assembled in a simplified process for thereby lowering the cost of manufacture.

Another object of the present invention is to provide a hydraulic transmission apparatus for self-propelled working vehicles, which allows the self-propelled vehicles to be highly maneuverable.

To achieve the above objects, there is provided in accordance with the present invention a hydraulic transmission apparatus comprising input means to which power from a power source is applied in a first direction, direction changing means hydraulically coupled to the input means for extracting power from the input means in a second direction which is different from the first direction, output means for applying the power extracted in the second direction, and a case supporting the input means and the direction changing means, the input means comprising an oil pump mounted on one surface of the case, the direction changing means comprising an oil motor mounted on another surface of the case, the case being filled with working oil for operating the oil pump and the oil motor, and at least one of the oil pump and the oil motor being of the variable displacement type.

There is also provided an operating device for a lawn mower having a handle, a power source, a drive wheel, a grass cutter, a first power transmitting path for transmitting power from the power source to the drive wheel, and a second power transmitting path for transmitting power from the power source to the grass cutter, the first power transmitting path including a hydraulic transmission apparatus and first clutch means operatively coupled to the hydraulic transmission apparatus for selectively inactivating the hydraulic transmission apparatus, the second power transmitting path including second clutch means for selectively cutting off the second power transmitting path, the first clutch means being independently operable, and the second clutch means having a mechanism for actuating the first clutch means in unison therewith when the second clutch means is actuated.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
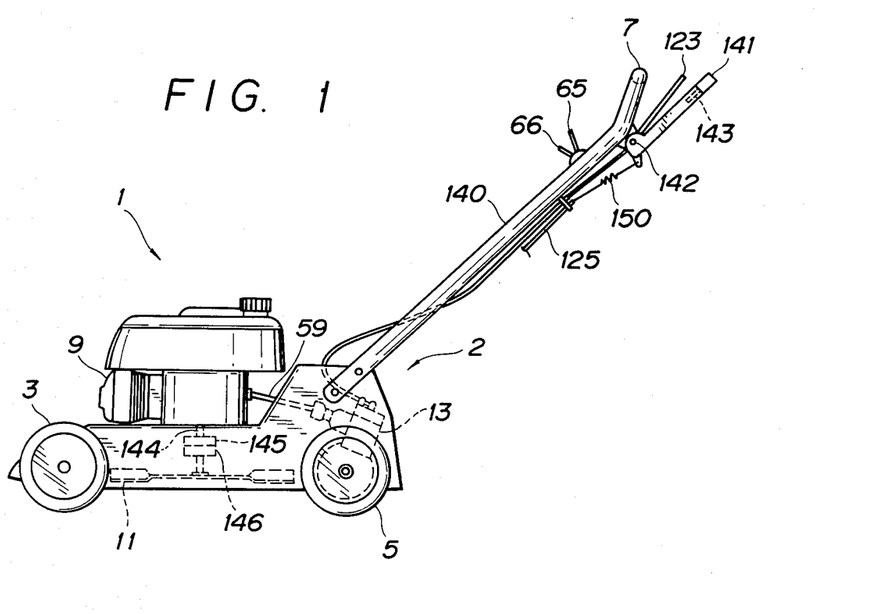
FIG. 1 is a side elevational view of a self-propelled lawn mower having a hydraulic transmission apparatus according to a first embodiment of the present invention.
Figure 2:
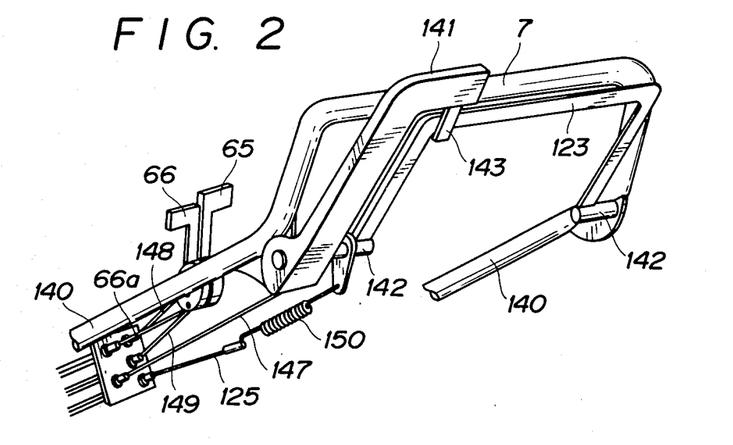
FIG. 2 is a perspective view of an operating device of the lawn mower.

As shown in FIGS. 1 and 2, a self-propelled lawn mower 1 has a hydraulic transmission apparatus 13 constructed in accordance with a first embodiment of the present invention. Front, rear, left, and right sides or directions hereinafter referred to are the same as the front, rear, left, and right sides or directions of the lawn mower 1. The left and right sides in FIG. 1 agree to the front and rear sides of the lawn mower 1. The lawn mower 1 has a frame 2 supporting two laterally spaced front wheels 3 and two laterally spaced rear drive wheels 5. Two laterally spaced, or left and right, pipes 140 are attached to and extend upwardly and rearwardly from the frame 2, and are joined at their upper ends into a handle 7. An engine 9 is mounted on the frame 2 between the front and rear wheels 3, 5 as a power source for operating the rear drive wheels 5 and a cutter 11. The engine 9 has an output shaft 59 connected to the hydraulic transmission apparatus 13 disposed between the rear drive wheels 5, which are rotated by the hydraulic transmission apparatus 13 in the manner described below.

A throttle lever 66 for controlling the speed of rotation of the engine 9 and a transmission lever 65 for controlling the speed of travel of the lawn mower 1 are mounted on the upper end of the lefthand pipe 140. The transmission lever 65 is coupled through wires 148, 149 to a pin 61 (FIG. 5) for angularly adjusting a swash plate 45 of an oil pump 15 (described later). The throttle lever 66 is coupled to the throttle valve (not shown) of the engine 9 by a wire 66a.

Two support shafts 142 are attached to the upper portions of the pipes 140, respectively, in the transverse direction of the lawn mower 1. A channel-shaped first lever 123 is swingably mounted on and between the support shafts 142, the first lever 123 being normally urged in a direction away from the handle 7 by means of a spring 150. The first lever 123 can be turned by the lawn mower operator toward the handle 7 for starting the hydraulic transmission apparatus 13. The first lever 123 is independently operable, and constitutes part of a clutch for selectively rotating and stopping the rear drive wheels 5. Swinging movement of the first lever 123 is transmitted to an arm 127 (FIG. 3) of the hydraulic transmission apparatus 13 through the spring 150 and a cable 125.

An inverted L-shaped second lever 141 is attached to the outer end of the left-hand support shaft 142, the second lever 141 being normally urged in a direction away from the handle 7 by means of a spring (not shown). The second lever 141 can be turned by the operator toward the handle 7 to start the cutter 11. The second lever 141 serves as part of a clutch for selectively rotating and stopping the cutter 11.

When the operator turns the second lever 141 toward the handle 7 to rotate the cutter 11, a finger 143 on an inner end of the second lever 141 engages the first lever 123 to turn the first lever 123 toward the handle 7. For actuating the cutter 11, unless an oil pump 15 (described later) is shifted to a neutral position, the hydraulic transmission apparatus 13 is operated to rotate the rear wheels 5. The finger 153 therefore serves as a mechanism for moving the first lever 123 in unison with the second lever 141.

The engine 9 is operatively coupled to the cutter 11 and the transmission apparatus 13 through respective independent transmission paths. The transmission path, denoted at 144, by which the engine 9 is operatively coupled to the cutter 11 has a clutch 145 and a cutter brake 146. To the lower end of the second lever 141, there is attached the upper end of a cable 147 connected to the transmission path 144. When the second lever 141 is turned toward the handle 7 by the operator, the cable 147 is pulled to connect the clutch 145. When the second lever 141 is released away from the handle 7, the cable 147 is loosened to disconnect the clutch 145 and operate the cutter brake 146.

Figure 3:
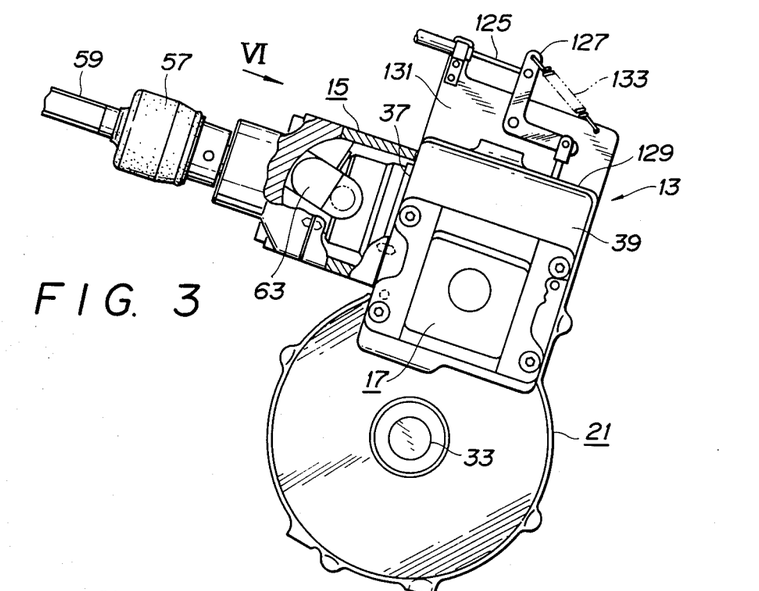
FIG. 3 is a self-hand side elevational view of the hydraulic transmission apparatus.
Figure 4:
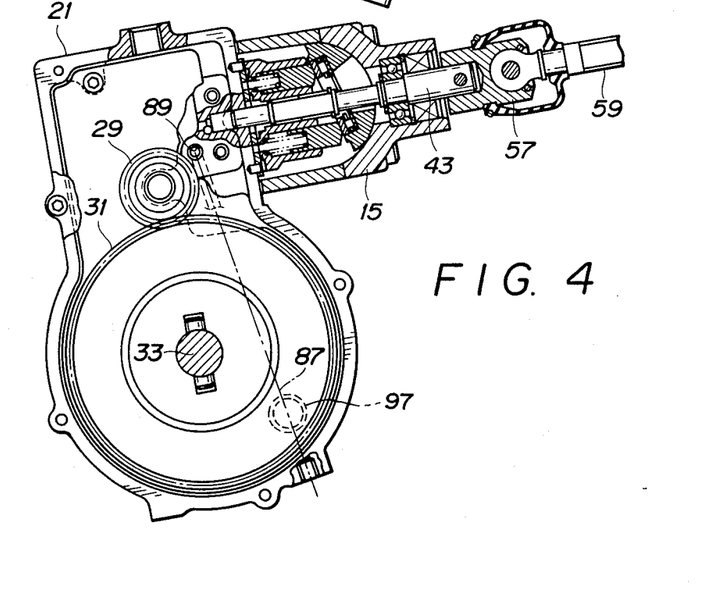
FIG. 4 is a partly sectional right-hand side elevational view of the hydraulic transmission apparatus.
Figure 5:
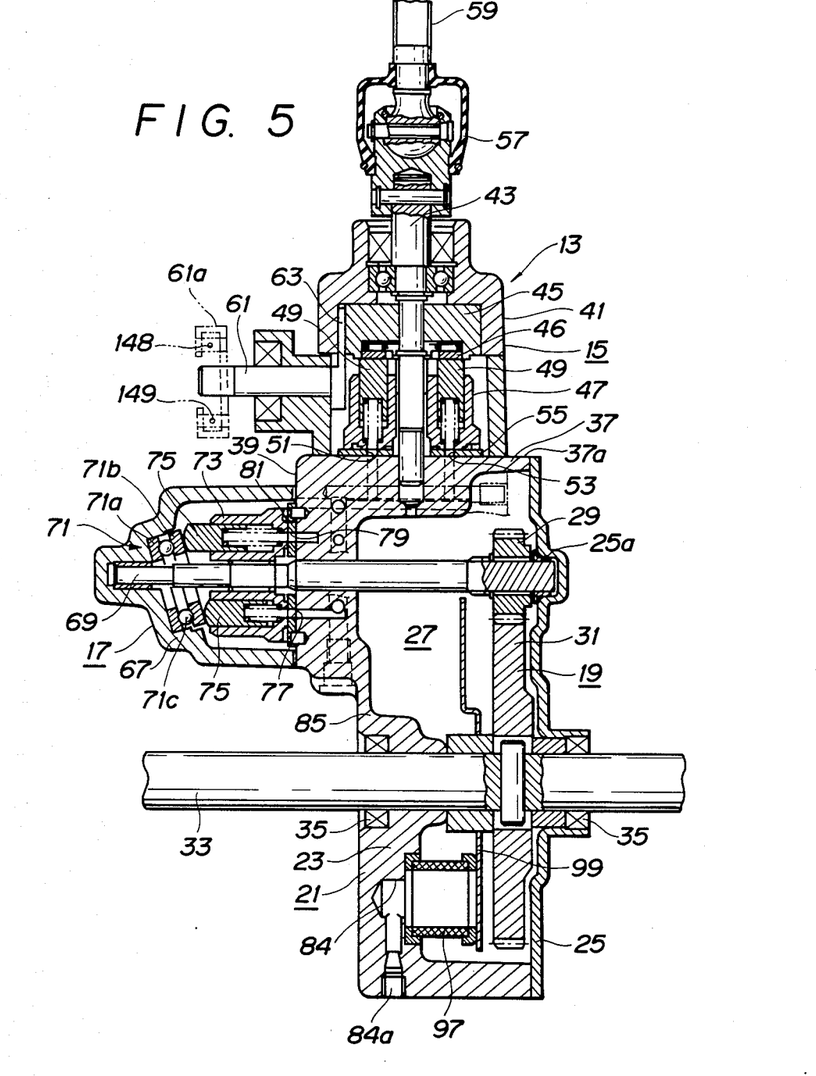
FIG. 5 is a horizontal cross-sectional view of the hydraulic transmission apparatus.
Figure 6:
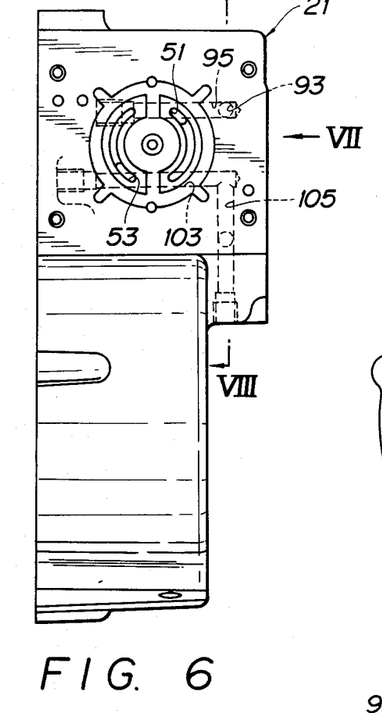
FIG. 6 is a view as viewed in the direction of the arrow VI in FIG. 3.

As illustrated in FIGS. 3 through 5, the hydraulic transmission apparatus 13 has a reducer case 21 through which an axle 33 for the rear wheels 5 extends transversely of the lawn mower 1, an oil pump 15 and an oil motor 17 which are mounted respectively on a front surface 37a of an upper portion 37 of the reducer case 21 and an upper lefthand surface 39 of the reducer case 21, and a speed reducer mechanism 19 housed in the reducer case 21. The surfaces 37a, 39 lie substantially perpendicularly to each other. The oil pump 15 is operatively coupled to the engine output shaft 59 by means of a universal joint 57. The oil motor 17 is hydraulically operable by the oil pump 15. The oil pump 15 comprises a swash-plate axial-piston pump of the variable displacement type, and the oil motor 17 comprises a swash-plate axial-piston motor of the fixed displacement type. The oil pump 15 and the oil motor 17 are of good cooling efficiency since they are mounted on the different surfaces 37a, 39 of the reducer case 21.

The reducer case 21 comprises a case body 23 opening in the rightward direction, and a cover 25 attached to the right-hand end of the case body 23 to close the same. The oil motor 17 has an output shaft 69 with its inner end supported by a bearing 25a. The reducer case 21 is in the form of a box. The speed reducer mechanism 19 is disposed in an inner space 27 of the case 21 which is filled with a prescribed amount of oil. The speed reducer mechanism 19 comprises a smaller-diameter gear 29 and a larger-diameter gear 30 which are held in mesh with each other. The reducer case 21 doubles as an oil tank of working oil for the oil pump 15 and the oil motor 17.

The rear wheel axle 33 extends through the reducer case 21 through two seal bearings 35. The larger-diameter gear 31 is mounted on the axle 33 within the reducer case 21. The smaller-diameter gear 29 is mounted on the output shaft 69 of the oil motor 17 which extends into the reducer case 21 parallel to the axle 33.

The oil pump 15 comprises a pump case 41, a drive shaft 43 disposed in the pump case 41, a partly cylindrical swash plate 45 tiltably disposed in the pump case 41, and a cylinder block 47 rotatable with the drive shaft 43. The drive shaft 43 has a front end projecting forwardly from the pump case 41 and operatively coupled to the rear end of the engine output shaft 59 through the universal joint 57. The oil pump 15 also has a plurality of pistons 49 disposed concentrically in the cylinder block 47 and reciprocally movable with respect to a thrust bearing 46 of the swash plate 45 in response to rotation of the drive shaft 43. A circular valve plate 55 is sandwiched between the lower surface of the cylinder block 47 and the front surface 37 of the reducer case 21, the valve plate 55 having an inlet port 51 and an outlet port 53.

To the center of left-hand end surface of the swash plate 45, there is attached an end of a lever 63 with its opposite end fixed to the pin 61 which is rotatably mounted on the case 41. The angle of inclination of the flat surface of the swash plate 45 with respect to the axis of the drive shaft 43 can be adjusted by turning the lever 63 about the pin 61. The outer end of the pin 61 is connected to the center of an arm 61a which has opposite ends joined to the respective ends of the wires 148, 149 that can be moved by the transmission lever 65. Swinging movement of the transmission lever 65 is transmitted via the wires 148, 149 to the arm 61a and the pin 61 to turn the pin 61. The swash plate 45 is thus angularly adjustable through a prescribed angle between a forward postion, a neutral position, and a reverse position by the transmission lever 65. Therefore, the oil pump 15 and hence the transmission apparatus 13 can continuously be adjusted between different transmission ratios representing the forward, full-speed position, the neutral position, and the reverse, full-speed position.

The oil motor 17 comprises a motor case 67, the output shaft 69 disposed in the motor case 67, a swash plate 71 disposed in the motor case 67, and a cylinder block 73 rotatable with the output shaft 69. The swash plate 71 is inclined at a fixed angle to the axis of the output shaft 69. The inner end of the output shaft 69 extends into the inner oil chamber 27 of the reducer case 21. The oil motor 17 also has a plurality of pistons 75 disposed concentrically in the cylinder block 73. A circular valve plate 81 is disposed between the lower surface of the cylinder block 73 and the left-hand surface 39 of the case 21, the valve plate 81 having an inlet port 77 and an outlet port 79. The inlet port 77 and the outlet port 79 communicate with the outlet port 53 and the inlet port 51, respectively, of the oil pump 15, as described later. When the oil pump 15 is in operation, the pistons 75 are pushed toward and pulled away from the swash plate 71 under hydraulic pressure Therefore, the cylinder block 73 is rotated while the pistons 75 are reciprocally moved toward and away from the swash plate 71. As a result, the output shaft 69 is rotated about its own axis. Such rotation of the output shaft 69 is transmitted to the rear wheel axle 33 through the speed reducer mechanism 19 (the smaller-diameter gear 29 and the larger-diameter gear 31). For smoothing the rotation of the cylinder block 73, the swash plate 71 comprises a fixed outer plate member 71a and an inner plate member 71b rotatably held against the fixed outer plate member 71a through a bearing 71c therebetween.

A hydraulic circuit of the hydraulic transmission apparatus 13, including the oil pump 15 and the oil motor 17, will be described with reference to FIGS. 6 through 9.

Figure 9:
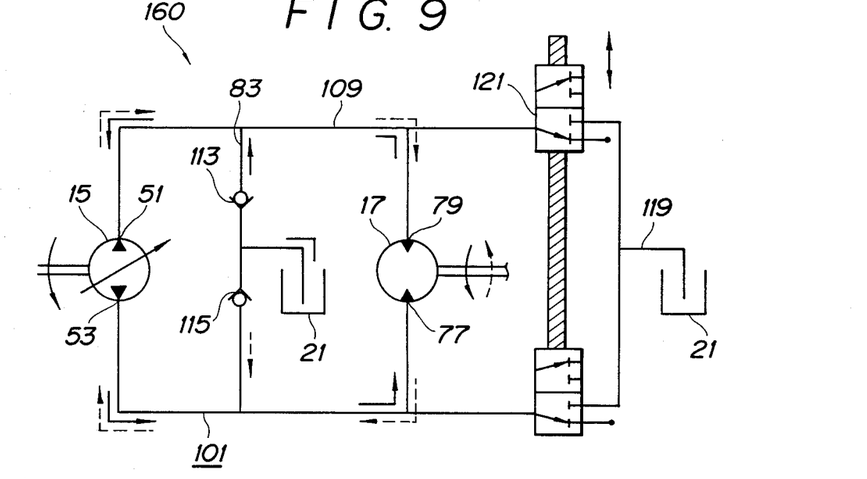
FIG. 9 is a circuit diagram of a hydraulic circuit of the hydraulic transmission apparatus.

The oil pump 15 and the oil motor 15 are interconnected by a closed hydraulic circuit 160 (FIG. 9) comprising circuits 101, 109. The hydraulic circuit show in FIG. 9 is of such a state that the first lever 123 is turned toward the handle 7.

An inlet passage 83 (FIG. 9) for supplying oil from within the reducer case 21 to the oil pump 15, an oil passage 87 (FIG. 4) having a lower end opening at 84 into the reducer case 21 and extending upwardly in a left-hand wall 85 of the reducer case 21, an oil passage 89 (FIGS. 4 and 8) joined to the oil passage 87 and extending to the left, an oil passage 91 (FIG. 8) joined to the left-hand end of the oil passage 89 and extending vertically, an oil passage 93 (FIGS. 6 and 8) joined to the upper end of the oil passage 91 and extending in the front and rear directions, and an oil passage 95 (FIGS. 6 and 8) joined to the front end of the oil passage 93 and extending rightwardly to the inlet port 51. All of the oil passages 87, 89, 91, 93, and 95 are defined in the left-hand wall 85 of the reducer case 21. The opening 84 (FIG. 5) in the reducer case 21 is covered with a plug 84a and an oil filter 97 with a shield plate 99 attached to the end of the oil filter 97. The shield plate 99 divides the inner chamber 27 into a space housing the speed reducer mechanism 19, and a chamber into which the opening 84 opens.

The oil circuit or passage 101 (FIG. 9) which holds the outlet port 53 of the oil pump 15 and the inlet port 77 of the oil motor 17 comprises an oil passage 103 (FIGS. 6 and 8) extending to the left from the outlet port 53, an oil passage 105 (FIGS. 6, 7, 8) joined to the left-hand end of the oil passage 103 and extending downwardly, and an oil passage 107 (FIG. 8) joined to the oil passage 105 and extending rearwardly to the inlet port 77.

The oil passage 109 (FIG. 9) by which the outlet port 79 of the oil motor 17 and the inlet port 51 of the oil pump 15 are held in communication with each other comprises an oil passage 111 (FIG. 8) extending upwardly from the outlet port 79 and the oil passages 93, 95 (FIGS. 6 and 8) communicating with the oil passage 111.

The oil passage 91 serving as the inlet passage 83 has a lower end communicating with the oil passage 107. Check valves 113, 115 (FIGS. 8, 9) are disposed between the upper end of the oil passage 91 and the oil passage 93 and between the lower end of the oil passage 91 and the oil passage 107.

Figure 7:
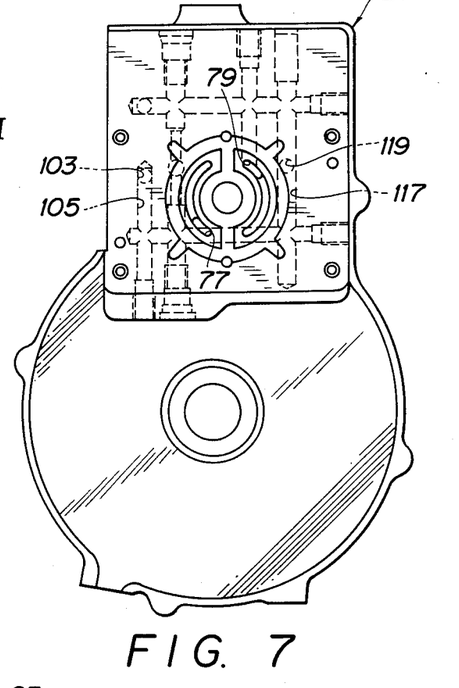
FIG. 7 is a view as viewed in the direction of the arrow VII in FIG. 7.
Figure 8:
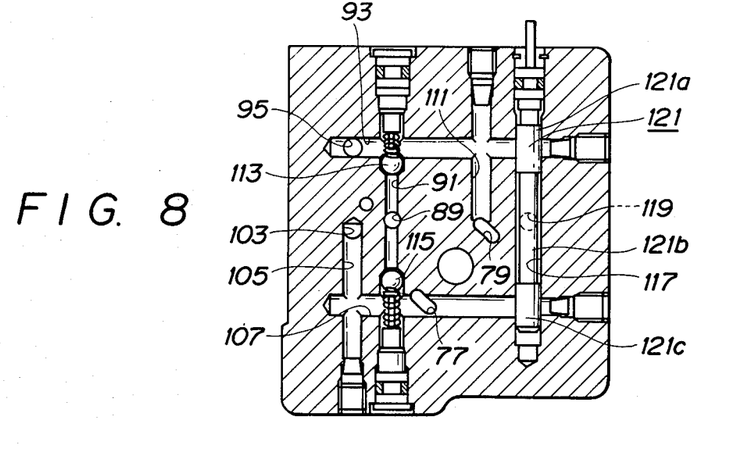
FIG. 8 is a cross-sectional view taken along line VIII—VIII of FIG. 7.

As shown in FIGS. 7 and 8, a vertical oil passage 117 is defined in a rear portion of the left-hand wall 85 of the reducer case 21 in communication with the rear ends of the oil passages 93, 107. An oil passage 119 communicating with the oil chamber 27 in the reducer case 21 opens into an intermediate portion of the oil passage 117.

Figure 10:
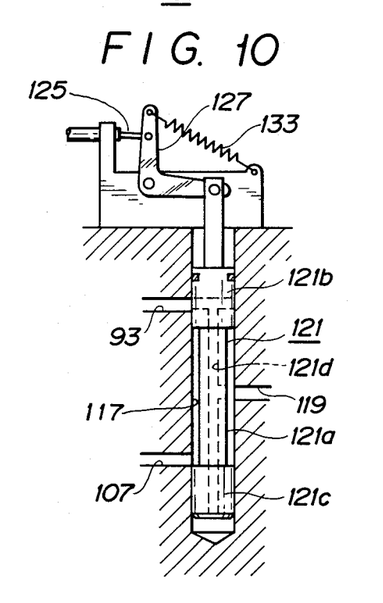
FIGS. 10 and 11 are cross-sectional views showing two selective positions, respectively, of a directional control valve disposed in the hydraulic transmission apparatus for a clutch for selectively rotating and stopping drive wheels.
Figure 11:
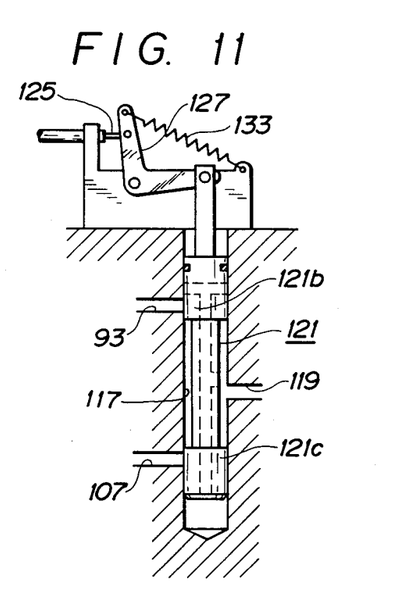
Figure 12:
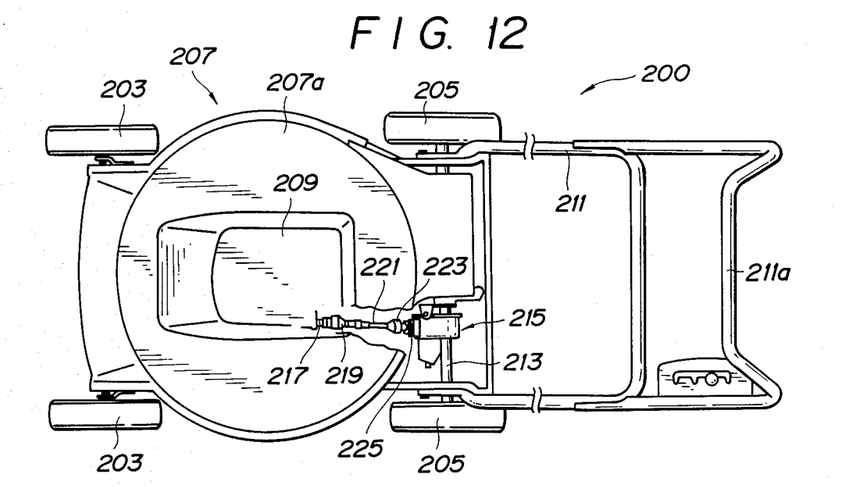
FIG. 12 is a plan view of a self-propelled lawn mower having a hydraulic transmission apparatus according to a second embodiment of the present invention.

As illustrated in FIGS. 8 through 11, a directional control valve 121 is inserted in the oil passage 117, i.e., disposed in the left-hand wall 85 of the reducer case 21. The directional control valve 121 is coupled to the cable 125 joined to the first lever 123 through a crank arm 127 pivotally mounted on a bracket 131 (FIG. 3) disposed on a left-hand portion of an upper surface 129 of the reducer case 21. The upper surface 129 lies substantially perpendicularly to the surfaces 37a, 39 on which the oil pump 15 and the oil motor 17 are respectively mounted. The crank arm 127 is normally urged clockwise in FIGS. 10 and 11 by means of a spring 133 for causing the wire 125 to displace the first lever 123 in a direction away from the handle 7. In FIG. 10, the first lever 123 is not turned toward the handle 7 by the operator, and hence the arm 127 is in a right-hand limit position. In FIG. 11, the first lever 123 is turned toward the handle 7 by the operator, and hence the arm 127 is in a left-hand limit position.

The directional control valve 121 comprises a spool valve having a central smaller-diameter shank 121a and upper and lower larger-diameter portions 121b, 121c on the upper and lower ends of the shank 121a. However, the directional control valve 121 may comprise any of various other suitable valves. The directional control valve 121 has an axial oil passage 121d defined therein which opens at a peripheral surface of the upper larger-diameter portion 121b and a peripheral surface of the central smaller-diameter shank 121a. In the position of FIG. 10, the directional control valve 121 provides communication between the oil passages 93, 107 and the oil passage 119 through the axial oil passage 121d and the outer space around the smaller-diameter shank 121a. Therefore, the oil pump 15 and the oil motor 17 are hydraulically disconnected from each other to stop the oil motor 17. In the position of FIG. 11, conversely, the upper and lower larger-diameter portions 121b, 121c of the directional control valve 121 close the rear ends of the oil passages 93, 107, thereby making the closed circuit 160. Under this condition, hydraulic power from the oil pump 15 is transmitted to the oil motor 17. The position of FIG. 10 in which the operator releases the first lever 123 can be regarded as a condition in which the clutch for selectively rotating and stopping the rear drive wheels 5 is actuated.

Operation of the hydraulic transmission apparatus 13 will be described below.

The cylinder block 47 is rotated while the input drive shaft 43 of the transmission apparatus 13 is being rotated by the engine output shaft 59. The angle of the flat surface of the swash plate 45 with respect to the drive shaft 43 is adjusted to one of the following three angular positions by the lever 63 operated by the transmission lever 65:

(I) It is now assumed that the first lever 123 is turned toward the handle 7 by the operator and hence the directional control valve 121 is in the position of FIG. 11.

(i) In case the swash plate 45 is in the neutral position in which the flat surface of the swash plate 45 lies parallel to the valve plate 55: Even when the cylinder block 45 is rotated, the pistons 49 do not reciprocally move toward and away from the swash plate 45, and no power is generated. The cylinder block 73 of the oil motor 17 is not rotated either.

(ii) In case the swash plate 45 is turned from the condition (i) in one direction for the forward position: As the cylinder block 47 rotates, the pistons 49 reciprocally move toward and away from the swash plate 45 to produce hydraulic power. This power is transmitted through the closed circuit 160 (FIG. 9) to the oil motor 17 for thereby rotating the cylinder block 73 thereof.

The closed circuit 160 is supplied with working oil via the check valve 113 from the within reducer case 21, as required. The oil flow in this mode of operation is indicated by the solid-line arrows in FIG. 9. The hydraulic power generated by the oil pump 15 is substantially proportional to the angle of inclination of the swash plate 45.

(ii) In case the swash plate 45 is turned from the condition (i) in the direction opposite to the direction in (ii): As the cylinder block 47 rotates, the pistons 49 reciprocally move toward and away from the swash plate 45 in opposite phase to that of the mode (ii) to produce hydraulic power in the direction opposite to the direction in the mode (ii). This power is transmitted through the closed circuit 160 to the oil motor 17 for thereby rotating the cylinder block 73 thereof in the direction opposite to the direction in the mode (ii). The closed circuit 160 is supplied with working oil via the check valve 113 from the within reducer case 21, as required. The oil flow in this mode of operation is indicated by the broken-line arrows in FIG. 9. The hydraulic power generated by the oil pump 15 is also substantially proportional to the angle of inclination of the swash plate 45.

(II) It is assumed that the first lever 123 is not turned toward the handle 7 by the operator, and the directional control valve 121 is positioned as shown in FIG. 10. As described above, no power is transmitted to the oil motor 17 irrespective of whether the oil pump 15 generates power or not.

In the modes (I) –(i), (ii) above, power from the engine 9 is transmitted through the oil pump 15, the oil motor 17, and the speed reducer mechanism 19 to the rear wheel axle 33. The angle of inclination of the swash plate 45 is adjusted by the transmission lever 65 to adjust the speed of rotation of the rear drive wheels 5. Therefore, while keeping the speed of rotation of the cutter 11, the speed of travel of the lawn mower 1 can be selected as desired by the operator. As a consequence, the lawn grass can be cut off to a desired degree such as rough cutting, finish trimming, or the like. In the position of FIG. 10 (when the clutch for selectively rotating and stopping the drive wheels 5 is actuated), the directional control valve 121 communicates the oil passages 93, 107 with the reducer case 21. Instead, however, the directional control valve 121 may be arranged to communicate a suitable oil passage of the closed circuit 160 with the reducer case 21.

In the above embodiment, the oil pump 15 and the oil motor 17 serve as input means and direction changing means, respectively, for the engine power. The direction in which the engine power is applied (around the engine output shaft 59 and the drive shaft 43) is changed by the oil motor 17 to a different direction (around the output shaft 69 and the rear wheel axle 33). The oil pump 15 and the oil motor 17 are mounted on the different wall surfaces 37a, 39 of the reducer case 21 which houses the speed reducer mechanism 19. The hydraulic circuit interconnecting the oil pump 15 and the oil motor 17 is defined in the outer wall of the reducer case 21. The directional control valve 121 is disposed in the hydraulic circuit. Bevel gears, which have been employed in the conventional hydraulic transmission apparatus, are dispensed with, and hence the number of parts required is reduced. The hydraulic transmission apparatus 13 is therefore reduced in overall size and simplified in structure, and hence the process of assembling the hydraulic transmission apparatus 13 is simplfied, resulting in a reduction in the cost of manufacture thereof.

These advantages are also attained by the fact that the outer wall of the reducer case 21 and oil contained therein are utilized. For a less expensive lawn mower, the hydraulic circuit shown in FIG. 9 may be replaced with a hydraulic circuit arranged to provide a forward mode only.

While only the oil pump 15 is of the variable displacement type in the above embodiment, at least one of the oil pump 15 and the oil motor 17 may be of the variable displacement type. It is also possible to employ an oil pump and an oil motor which may be of other than the axial piston type. The oil pump 15 and the oil motor 17 may be disposed within the reducer case 21. Where the speed reducer mechanism 19 is not necessary, the rear wheel axle 33 may serve as the output shaft 69 of the oil motor 17.

The speed reducer mechanism 19 is disposed between the output shaft 69 of the oil motor 17 and the rear wheel axle 33. Therefore, the oil pump 15 and the oil motor 17 may be of the high-speed, low-torque type, i.e., of a small size, with the result that the hydraulic transmission apparatus 13 may further be reduced in size. The speed reducer mechanism may be modified such that it is disposed between the engine output shaft and the drive shaft of the oil pump.

When operating the cutter 11, unless the oil pump 15 is not in the neutral position, the transmission apparatus 13 is started at all times to rotate the rear wheels 5. More specifically, when the second lever 141 for the cutter 11 is turned toward the handle 7, the first lever 123 is also turned with the second lever 141 toward the handle 7. Therefore, the operator can move and operate the lawn mower 1 with a single hand. The first lever 123 can independently be turned toward the handle 7. Accordingly, the lawn mower 1 can be moved at a desired speed while holding the cutter 11 at rest. Consequently, the lawn mower 1 can be handled with increased maneuverability.

FIGS. 12 through 15 show a lawn mower 200 having a hydraulic transmission apparatus 215 according to a second embodiment of the present invention. The lawn mower 200 has a frame 207 supporting two laterally spaced front wheels 203 and two laterally spaced rear drive wheels 205. A channel-shaped pipe 211 is attached to and extends rearwardly and upwardly from the frame 207, with a handle 211a attached to the upper end of the pipe 211. An engine 209 serving as a power source for the rear drive wheels 205 and a cutter 207a is mounted on the frame 207 between the front and rear wheels 203, 205. The engine 209 has an output shaft 217 operatively coupled to input means 225 of the transmission apparatus 215 through a universal joint 219, a coupling shaft 221, and a universal joint 223.

The hydraulic transmission apparatus 215 is basically of the same construction as that of the hydraulic transmission apparatus 13 of the first embodiment. Therefore, identical or like parts of the hydraulic transmission apparatus 215 will not be described in detail. However, the transmission apparatus 215, particularly its hydraulic circuit, is different from the transmission apparatus 13 in that the transmission apparatus 215 does not have the directional control valve 121 serving as part of the clutch for selectively rotating and stopping the rear wheels, and those members which are associated with the directional control valve 121, and that the transmission apparatus 215 is continuously adjustable only between the forward, full-speed position and the neutral position. Accordingly, the transmission apparatus 215 is of a simpler construction.

Figure 13:
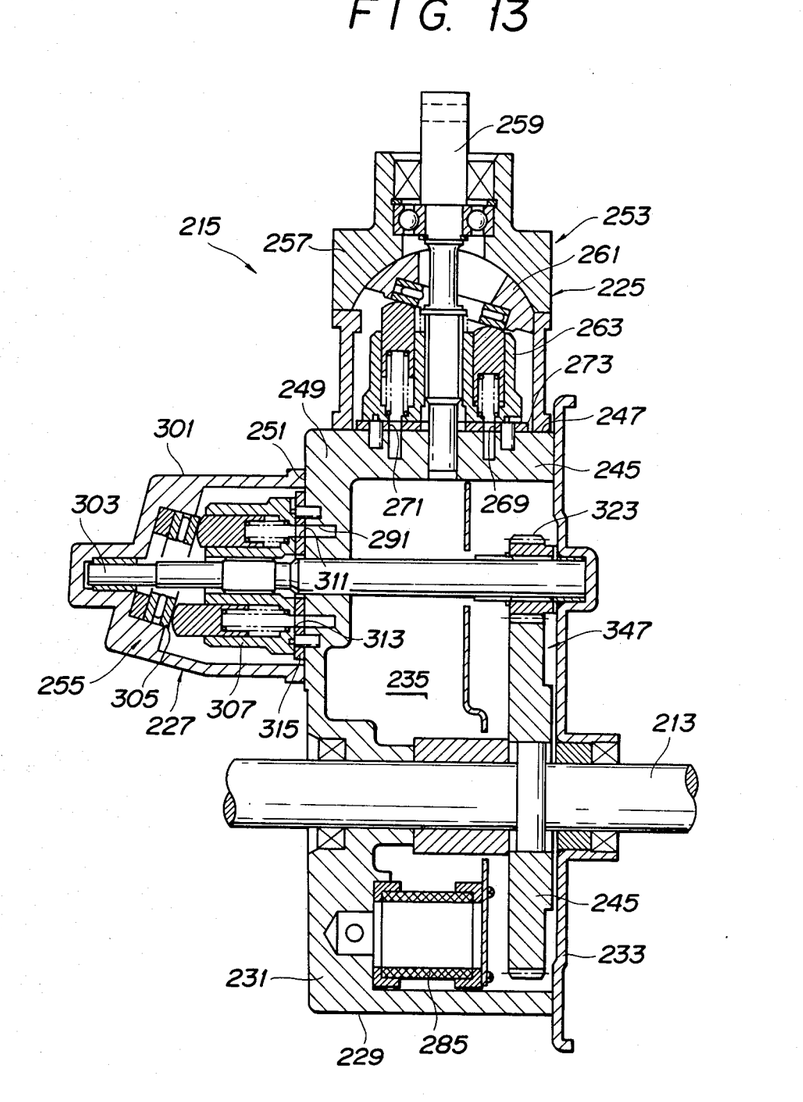
FIGS. 13 and 14 are horizontal cross-sectional and sectional right-hand side elevational views, respectively, of the hydraulic transmission apparatus in the self-propelled lawn mower shown in FIG. 12.
Figures 14, 15:
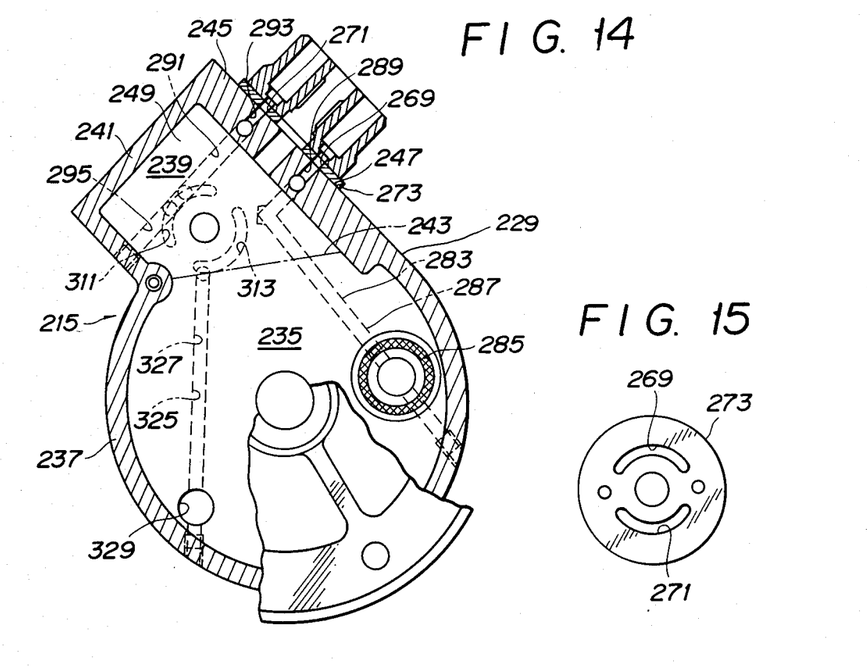
FIG. 15 is a plan view of a valve plate.

As shown in FIGS. 13 and 14, the transmission apparatus 215 has a reducer case 229 through which a rear wheel axle 213 extends in the transverse direction of the lawn mower 200, an oil pump 253 and an oil motor 255 which are mounted respectively on a front surface 247 of a front wall 245 of the reducer case 229 and a lefthand wall 249 thereof, and a speed reducer mechanism 347 housed in the reducer case 229. The oil pump 253 has an input drive shaft 259 operatively coupled to the engine-connected members 217, 219, 221, 223. The oil pump 253 serves as the input means 225. The oil pump 253 comprises a swash-plate axial-piston pump of the variable displacement type, whereas the oil motor 255 comprises a swash-plate axial-piston motor of the fixed displacement type.

The reducer case 229 comprises a case body 231 opening in the rightward direction, and a cover 233 attached to the righthand end of the case body 231 to close the same. The speed reducer mechanism 347 is disposed in an inner space 235 of the case 229 which is filled with a prescribed amount of oil. The speed reducer mechanism 347 comprises a smaller-diameter gear 323 and a larger-diameter gear 245 which are held in mesh with each other. The oil in the reducer case 229 has a surface level 243 (FIG. 14).

The oil pump 253 comprises a pump case 257, the drive shaft 259 disposed in the pump case 257, a partly cylindrical swash plate 261 tiltably disposed in the pump case 257, and a cylinder block 263 rotatable with the drive shaft 259. The oil pump 253 has a valve plate 273 as shown in FIG. 15, the valve plate 273 having an inlet port 269 and an outlet port 271 of the oil pump 253. The swash plate 261 is operatively connected to a transmission lever (not shown). The angle of inclination of the flat surface of the swash plate 261 with respect to the axis of the driver shat 259 can be adjusted by operating the transmission lever. The swash plate 261 can continuously be angularly adjusted between a forward, full-speed position and a neutral position.

The oil motor 255 comprises a motor case 301, an output shaft 303 disposed in the motor case 301, a fixed swash plate 305 disposed in the motor case 301, and a cylinder block 307 rotatable with the output shaft 303. Between the cylinder block 307 and the side wall 249 of the reducer case 229, there is sandwiched a valve plate 315 having an inlet port 311 and an outlet port 313. The oil motor 255 serves as direction changing means for changing the directions of transmission of power.

As shown in FIG. 14, the inlet port 269 of the oil pump 253 is supplied with oil from the inner oil chamber 235 of the reducer case 229 through an inlet oil passage 283. The inlet oil passage 283 comprises an oil passage 287 defined in the lefthand wall 249 of the reducer case 229 and an oil passage 289 defined in the front wall 245 of the reducer case 229 and joined to the upper end of the oil passage 287. The oil passage 287 has an opening which opens into the oil chamber 235 and which is covered with an oil filter 285. The outlet port 271 of the oil pump 253 is held in communication with the inlet port 311 of the oil motor 255 through an outlet passage 291. The outlet passage 291 comprises an oil passage 293 defined in the front wall 245 of the reducer case 229, and an oil passage 295 defined in the lefthand wall 249. The outlet port 313 of the oil motor 255 communicates with the inner oil chamber 235 of the reducer case body 231 via a return passage 325. The return passage 325 is defined in the lefthand wall of the reducer case 229, and comprises an oil passage 327 which opens at 329 into the inner oil chamber 235.

The hydraulic transmission apparatus 215 offers substantially the same advantages as those of the hydraulic transmission apparatus 13, except those advantages of the clutch for selectively rotating and stopping the rear wheels 205 and the reverse hydraulic circuit.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A hydraulic transmission apparatus for a vehicle having driving wheels, said apparatus comprising at least one oil pump to which power from a power source having a drive shaft is applied in a first direction, at least one oil motor hydraulically coupled to the oil pump for extracting power from said oil pump in a second direction which is different from said first direction, an output shaft for outputting the power extracted in said second direction, and a case supporting said oil pump and said oil motor, said case being in the form of a box, wherein
    (A) said drive shaft is directly connected to an input shaft of said oil pump,
    (B) said case is filled with working oil for operating said oil pump and said oil motor,
    (C) said oil pump is mounted on a first outer surface of said case,
    (D) said oil motor is mounted on a second outer surface of said case, said second surface being perpendicular to said first surface,
    (E) said oil motor has a driven shaft which extends into the interior of said case,
    (F) a speed reducer mechanism for transmitting power from said driven shaft to said output shaft is disposed within said case,
    (G) said output shaft penetrates said case in said second direction through an inner chamber of said case which is filled with said working oil, said output shaft being operatively connected at its ends with corresponding ones of said drive wheels, and
    (H) said case has a wall defining therein an inlet oil passages for communicating said working oil within said inner chamber of said case with said oil pump, an outlet oil passage for communicating said oil pump with said oil motor, and a return passage for communicating said oil motor with said working oil within said inner chamber of said case.

2. A hydraulic transmission apparatus according to claim 1, wherein at least one of said oil pump and said oil motor is of the variable displacement type.

3. A hydraulic transmission apparatus according to claim 1, wherein
    said case comprises a case body having an opening which opens in one direction and a cover closing said opening of said case body;
    said driven shaft of said oil motor extending into an inner chamber of said case which is filled with said working oil;
    wherein said output shaft is disposed parallel to said driven shaft of said oil motor and extending out of said case;
    said second surface of said case comprising an outer surface of a wall of said case body which confronts said cover; and
    said cover having bearings for said last-mentioned output shaft and said driven shaft of said oil motor.

4. A hydraulic transmission apparatus according to claim 1, wherein
    said oil pump has a working oil inlet opening opening into an inner chamber of said case which is filled with said working oil; and
    further including a shield plate disposed in said case and dividing said inner chamber into a chamber in which said speed reducer mechanism is disposed and a chamber into which said working oil inlet opening opens.

5. A hydraulic transmission apparatus according to claim 1,
    further including a directional control valve for selectively communicating said outlet passage with an inner chamber of said case which is filled with said working oil for hydraulically disconnecting said oil motor from said oil pump, said directional control valve being inserted into said wall through a third surface of said case which lies substantially perpendicularly to said first surface and said second surface of said case; and
    operating members mounted on said third surface for operating said directional control valve.

6. An operating device for a lawn mower having a handle, a power source, a drive wheel, a grass cutter, a first power transmitting path for transmitting power from said power source to said drive wheel, and a second power transmitting path for transmitting power from said power source to said grass cutter, said first power transmitting path including a hydraulic transmission apparatus and first clutch means operatively coupled to said hydraulic transmission apparatus for selectively inactivating the hydraulic transmission apparatus, said second power transmitting path including second clutch means for selectively cutting off said second power transmitting path,
    said first clutch means being independently operable; and
    said second clutch means having a mechanism for actuating said first clutch means in unison therewith when said second clutch means is actuated.

7. An operating device according to claim 6, wherein said hydraulic transmission apparatus has an oil pump to which power from said power source is applied, an oil motor hydraulically connected to said oil pump for operatively applying power to said drive wheel, and a tank filled with working oil for operating said oil pump and said oil motor;
    at least one of said oil pump and said oil motor being of the variable displacement type;
    said first clutch means having a first lever disposed near said handle and normally urged in a direction away from said handle, and a directional control valve operatively coupled to said first lever for selectively returning working oil flowing from said oil pump to said oil motor into said oil tank;
    said first clutch means being operable when said first lever is moved away from said handle, for inactivating said hydraulic transmission apparatus in response to operation of said directional control valve;

said second clutch means having a second lever disposed near said handle and normally urged in a direction away from said handle; and said second clutch means being operable when said second lever is moved away from said handle, for cutting off power to be transmitted to said grass cutter.

* * * * *